Jan. 6, 1970   R. B. SCHENCK   3,487,867
WHEEL CONSTRUCTION
Original Filed April 14, 1967   4 Sheets-Sheet 4
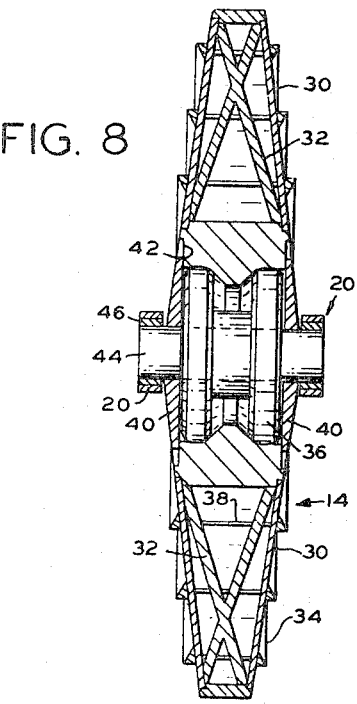
RAY B. SCHENCK
INVENTOR
BY
BUCKHORN, BLORE, KLARQUIST & SPARKMAN
ATTORNEYS United States Patent Office 3,487,867
Patented Jan. 6, 1970

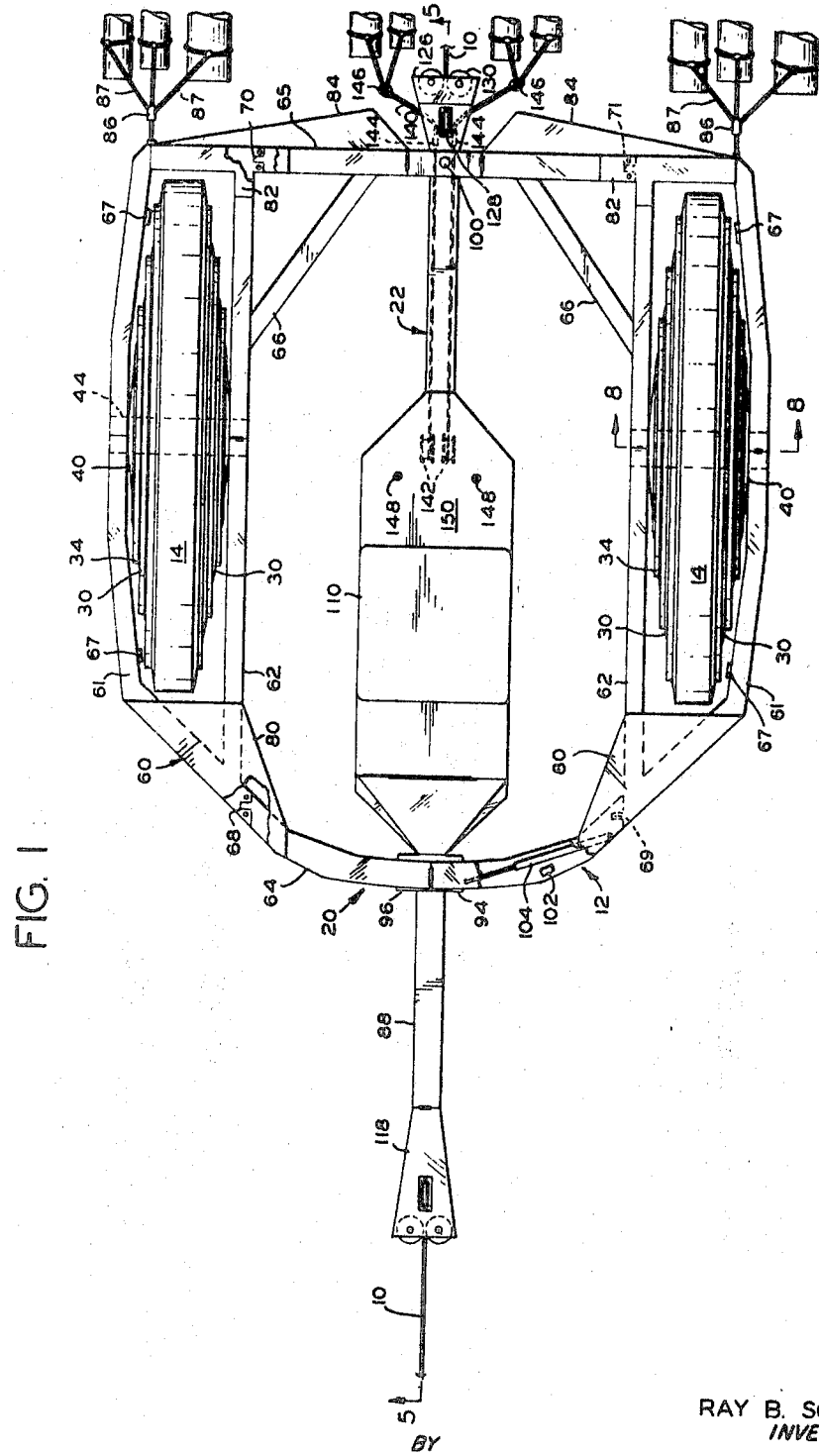

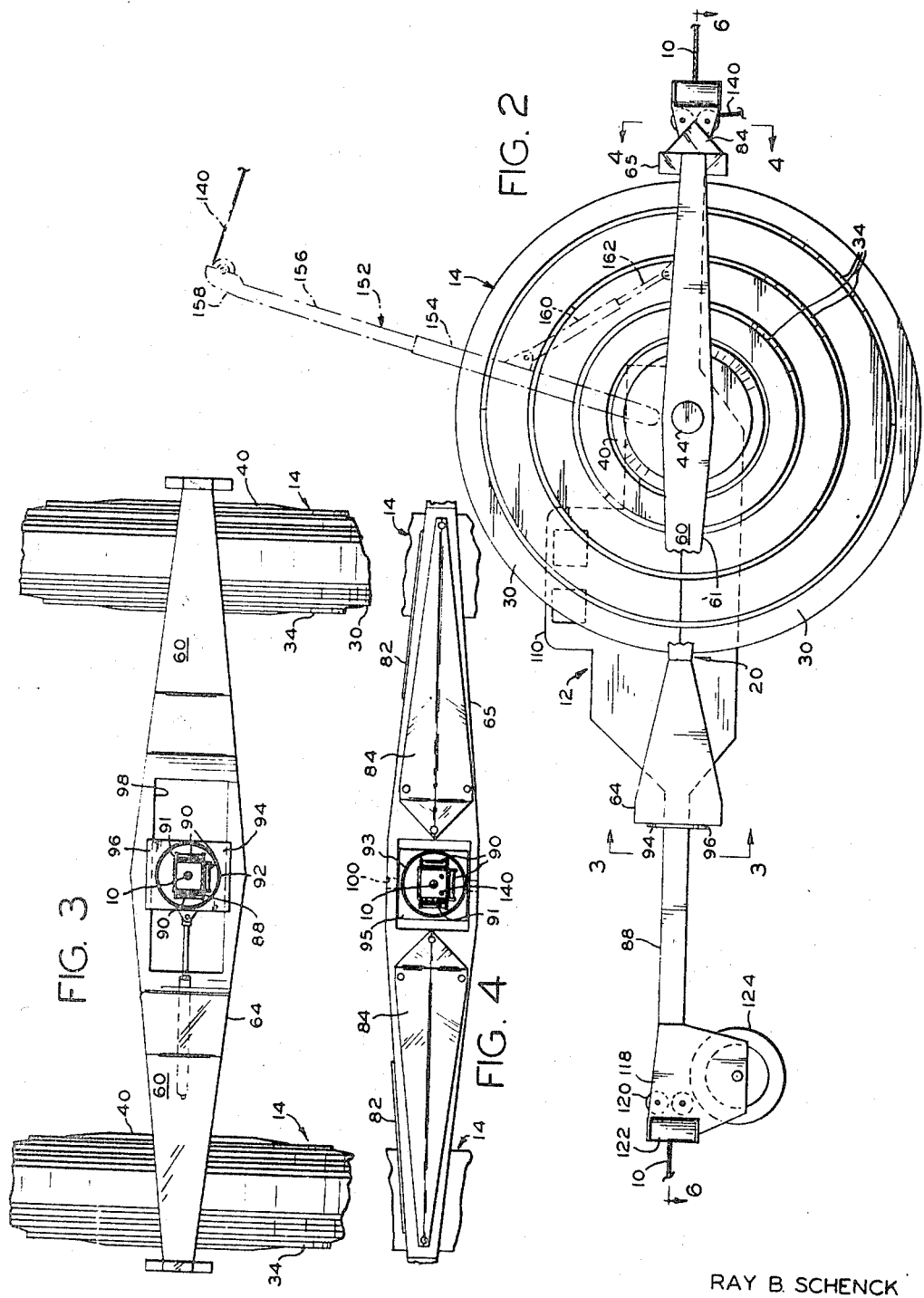

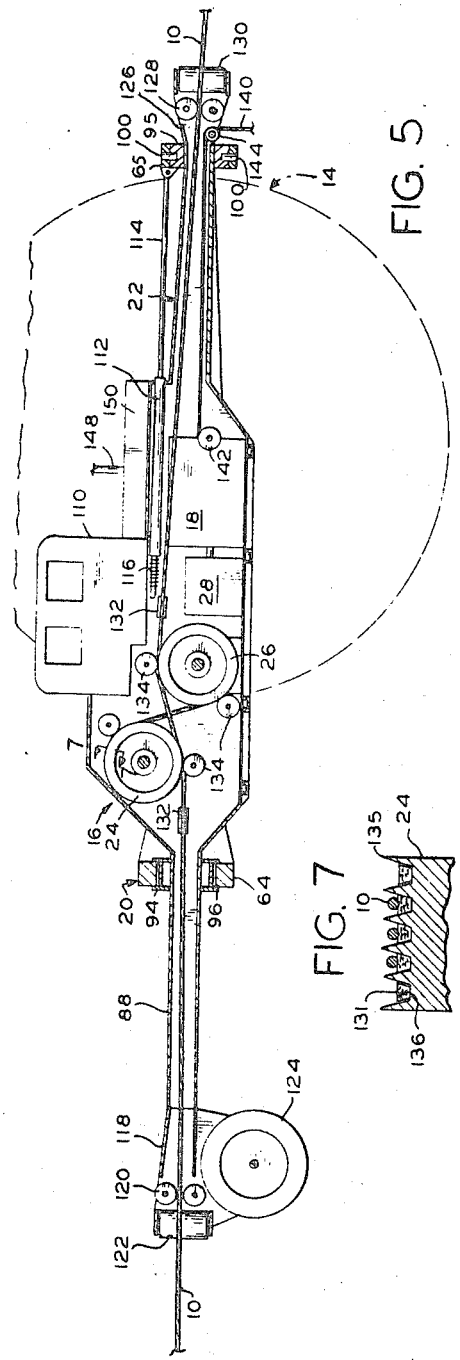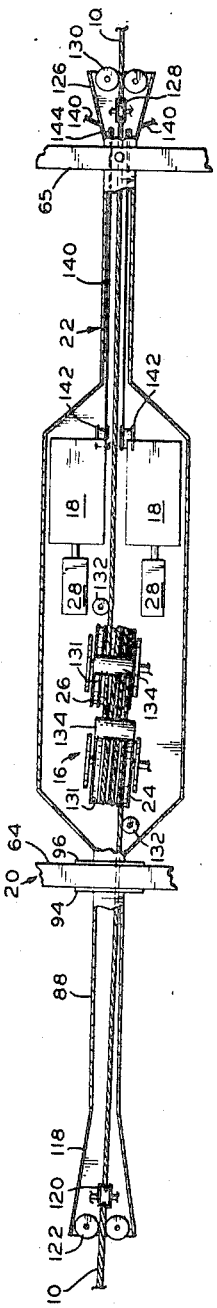

3,487,867
WHEEL CONSTRUCTION
Ray B. Schenck, P.O. Box 94,
Grays River, Wash. 97621
Original application Apr. 14, 1967, Ser. No. 631,021, now Patent No. 3,390,863, dated July 2, 1968. Divided and this application Jan. 24, 1968, Ser. No. 700,118
Int. Cl. B60b 9/10, 37/00
U.S. Cl. 152—47                 6 Claims

ABSTRACT OF THE DISCLOSURE

A cable system for logging timber utilizing a capstan motivated wheeled ground car having a rotatively mounted powered tongue that can be translated longitudinally of the car and to the end of which the logs are attached, both ends of the cable being anchored to the area to be logged, the system being well suited for use in widely varying logging terrain. The car is provided with wheels comprising symmetrical monolithic wheel halves spliced together by semi-circular rings positioned on their exterior.

Cross-reference to related application

This application is a division of my copending application, Ser. No. 631,021, filed Apr. 14, 1967, now Patent No. 3,390,863, issued July 2, 1968 for a Cable Logging System.

Background of the invention

This invention relates to a system for logging timber and, more particularly, to a cable logging system suitable for use on any type of terrain.

In past years the timber industry has logged the best and most accessible timber in the lower, gentle country where road-building was not much of a problem. Now the logging industry has had to move into steeper, more rugged country with attendant lower yields per acre, higher road-building costs and smaller log sizes. These factors together with the shorter logging season resulted from operation in the higher, steeper country have made logging more difficult and consequently more expensive.

Coupled with the aforementioned difficulties have been demands by conservation experts for less soil disturbance caused by road-building and logging operations. Loggers are being subjected to increasing pressure to avoid ruining and despoiling land, silting streams, and in fact all activities that tend to leave a timer-harvested area in a ravished-appearing condition.

The forementioned increases in expense and limitations on the type of operation in which the forester can engage have rendered presently available logging systems uneconomical. Many of these conventional systems require the building of extensive roads which are not only expensive, but also difficult to build. It has also been found that in the logging of steep country, it is the roads and the building of them rather than the actual skidding of the logs that causes most of the soil disturbance, erosion, slides and silting of streams. The actual log skidding plows the ground surface, but does not break through the vegetative duff and root mantle of the forest floor. However, all road building activity carves into, underneath, and substantially disturbs and destroys this same vegetative mantle.

Furthermore, conventional aerial cable logging systems such as highlead, skyline or jammer systems are limited by the fact that they cannot reach out far enough from the landing to produce logs easily and cheaply in rugged country. These presently existing aerial cable logging systems require that they be situated or located in such a position so that they are "in deflection"; this means that in order to function, these aerial cables must always be able to lift and deflect the log from the forested slope; unfortunately this is not always possible to achieve.

Summary of the invention

It is thus the primary object of the present invention to provide a logging system that will require just one road at the bottom of a valley and possibly one other road on top of the ridge to make it possible to remove substantially all of the timber economically from a side hill without violating good soil conservation practices.

It is a further object of the present invention to provide a system for logging timber that will be able to reach out and remove all the timber from an area with a minimum of expensive road building and soil disturbance.

It is a still further object of the present invention to provide a system for logging timber that will make it economically practicable to log in steep rugged country where log volumes per acre are low.

It is a still further object of the present invention to provide a system for logging timber that will be able to reach 4,000 feet or more into adverse terrain having any type of "deflection" problems.

A further object of the present invention is to provide a system for skidding timber long distances downhill, sidehill, or uphill depending on the particular demands of an area as to economics and good watershed husbandry.

A further object of the present invention is to provide a system for logging timber that will require a minimum investment in machinery.

A further object of the present invention is to provide a system for logging timber that will leave a watershed in good condition for future forest regrowth, wildlife, water production and recreation.

A further object of the present invention is to provide a logging system that will minimize the cost of producing a given amount of logs from stump to mill.

The present invention achieves these and other objects and advantages by providing an apparatus for use in logging timber which comprises a stationary ground cable, means to anchor both ends of the ground cable to the area to be logged and a ground car adapted to roll over obstacles of any size or description on said area. Means are provided to attach felled logs to one end of the ground car. A capstan is mounted on the ground car and the ground cable is wrapped around the capstan. Means are provided to rotate the capstan, thereby to make it possible to move the ground car back and forth on the ground cable pulling with it the attached logs.

Brief description of the drawings

The invention will be more fully described in the following specification and in the drawings which form a part thereof and in which:

FIG. 1 is a plan view of apparatus constructed in accordance with the present invention;
FIG. 2 is a side view of the apparatus shown in FIG. 1;
FIG. 3 is a sectional viwe taken on line 3—3 of FIG. 2;
FIG. 4 is a sectional view taken on line 4—4 of FIG. 2;
FIG. 5 is a sectional view taken on line 5—5 of FIG. 1;
FIG. 6 is a sectional view taken on line 6—6 of FIG. 2;
FIG. 7 is a sectional view taken on line 7—7 of FIG. 5;
FIG. 8 is a sectional view taken on line 8—8 of FIG. 1;
FIG. 9 is a view partially in section of a different embodiment of a wheel for use in the ground car of the present invention;
FIG. 10 is a sectional view similar to FIG. 7 showing an alternate embodiment of the capstan construction; and
FIG. 11 is a schematic view of a typical logging system incorporating the apparatus of the present invention.

General description of the preferred embodiment

As shown in FIGS. 1, 2, 5, 6, 10 and 11, the apparatus of the present invention comprises a stationary ground cable 10 and a ground car 12 adapted to pull itself back and forth on the ground cable. The logging is done by the ground car which has wheels 14 large enough to roll over obstacles that may be found on logging terrain. The cable 10 is wrapped around a capstan 16 mounted on the ground car 12 and driven by two diesel engines 18. The ground car 12 can be operated by an operator stationed aboard it or by radio signals from a remote station.

The ground car 12 basically is composed of three assemblies: the wheels 14, a frame 20, and a power tongue 22. The frame 20 is so designed that it warps around the wheels 14 in a manner such that no tree, snag or other obstruction can lodge itself into the exterior of the machine. The frame 20 is also so designed that the ground car 12 actually can skid harmlessly on its side if such be required. The power tongue assembly 22 is mounted within the frame 20 and includes the capstan 16 which comprises two metal drums 24, 26 (FIG. 5).

The diesel engines 18 are mounted in the power tongue assembly 22 and drive hydraulic pumps 28 which in turn transmit the power to hydraulic motors 29 in the capstan drums 24, 26. The cable 10 is wrapped in a "figure-8" around the capstan drums 24, 26 in the manner shown. All forward, rearward, braking and holding action originates from the powered capstan 16 as will be further disclosed hereinafter.

The wheels 14 and frame 20 are made large enough so that they can roll or slide over practically any obstacle in the terrain to be logged, be it a huge stump, log, rock or hole. The wheels 14, which may vary from 6 feet to 20 feet or more in diameter, will permit the apparatus to wade through swamps, muskeg, jungle and tidelands.

The engines 18 are provided with an air breather and exhaust stack which are snorkled high enough on the power tongue 22 to permit the car 12 to move through substantial depths of water.

The frame 20 is symmetrical longitudinally and also top and bottom, so that on a steep side slope the car 12 can turn upside down and still maneuver in exactly the same manner. The power tongue assembly 22 is swivel mounted in the frame 20, thereby to permit it to rotate on its longitudinal axis. Since the power tongue assembly 22 has its own center of gravity, it will therefore remain upright even if the car 12 otherwise be turned upside down. The power tongue 22 can also be moved forward and backward with respect to the frame 20 to balance varying loads of logs on the rear of the car 12. If the ground car strikes a large obstacle over which the wheels cannot roll, the machine is so designed that it will climb up and deflect its way past the obstacle. The car is also so balanced that it will not skid on its side very long; it will either right itself or roll completely over.

The wheel assembly

Turning first to the wheel assembly, each of the wheels 14 comprise two symmetrical tapered, frustoconical metal wheel halves 30 bolted together on a diameter of the wheel. (See FIG. 8.) Interior radial cross bulkheads 32 provide the wheels with strength. The wheels have a solid monolithic exterior surface, with no holes, spokes or other structure in which slash, wood or rock can get caught.

Semi-circular grid rings 34 are positioned on the exterior of the wheels 14 and are staggered so that they reinforce the wheels while also splicing them across the disconnecting line of the wheel halves 30. (See FIG. 2.) The primary function of the grid rings 34, however, is to function as a secondary rim so that when the ground car 12 is in operation, the wheels 14 can climb up on the side of a rock or stump and not wedge or jam into these obstacles.

Two standard rubber tractor tire and wheel assemblies 36 are mounted side-by-side interiorly and coaxially of the wheels 14 in the manner shown in FIG. 8. The tire and wheel assemblies 36 function as the shock absorbers for the ground car 12. Cross-tie bolts 38 are provided to tie the grid rings 34 and wheel halves 30 together on each side and also to tie the rubber tire and wheel assemblies 36 together. Guide disks 40 on each side of the wheels 14 can move vertically on greased slides 42 and thus permit the wheels 14 to move up and down under load by compressing the tractor tires, but prevent any lateral or sidewise movement. The entire assembly of wheel halves 30, grid rings 34, rubber tire and wheel assemblies 36, cross-tie bolts 38 and guide disks 40 are mounted on a hollow axle 44 which rotates with the entire wheel assembly and is mounted in bearings 46 in the frame assembly 20.

A modified form of wheel assembly 50 is shown in FIG. 9. Whereas the frustoconical wheels 14 shown in FIGS. 1-3 and 6 are particularly well adapted for use on tough rocky slopes and in wading through soft muskegs, the wheel 50 shown in FIG. 9 is cylindrical and hence has more rim surface, thereby to be adapted to roll harmlessly over less rugged forest soils. The wheel 50 is mounted on an axle 52 and is retained in position thereon by guide disks 54 which can move vertically in greased slides 56. The wheel 50 is provided with internal radial cross braces 58 as shown. Two standard rubber tractor tire and wheel assemblies 59 are mounted side-by-side inside the wheel to serve as shock absorbers.

Both the wheels 14 shown in FIGS. 1-3 and 8 and the wheels 50 shown in FIG. 9 have a crushing, mashing and pulverizing effect on the residual logging slash, thereby to break down even the largest log chunks into smaller aggregates. The slash will thus be broken and rolled into the soil where the forces of nature, e.g., the various rots and fungi, can work on it. In some instances, this action will eliminate the need for burning the slash, but if it is to be burned, the fire will have more fuel surface to attack and correspondingly smaller aggregates to consume.

The frame assembly

As shown in FIGS. 1, 3 and 4, the frame assembly 20 is symmetrical with respect to its longitudinal axis, i.e., both longitudinally and top and bottom. The frame 20 is also designed so that it completely surrounds the wheel assemblies, thereby to permit no obstruction to lodge itself into a wheel's exterior. As mentioned above, the wheel axles rotate with the entire wheel assemblies in bearings 46 mounted in the frame assembly 20.

Protecting the wheel 14 on each side of the exterior of the car 12 is a unitary detachable wheel frame assembly 60 comprising an outside frame beam 61 which tapers in depth forwardly and rearwardly from the axle bearing 46 and an inside frame beam 62 which may be of relatively constant depth. Both the beams 61 and 62 are preferably of a box beam type construction. Each of the assemblies 60 is attached at the front of the car 12 to one of the ends of a front frame beam 64 which is also a box beam and which tapers in depth from its midsection, where it supports the power tongue assembly 22, to its end. (See FIG. 3.) The front frame beam 64 is also curved in the horizontal plane, i.e., from its midpoint to each end, so that in operation the car can glance or slide off or ward away obstacles as they are encountered. Each of the assemblies 60 is attached at its rear to one of the ends of a rear frame beam 65 which is also of a box beam type of construction and which tapers in depth both ways from its midpoint, where it supports the power tongue assembly 22, to its ends. (See FIG. 4.) Diagonal frame beams 66 are provided between the rear frame beam 65 and the inside frame beams 62 to strengthen the structure. A rubber faced roller 67 is mounted near the front and rear of each of the outside frame beams 61 as shown in FIG. 1. The rollers 67 provide extra support for the wheels 14 when an impact deflects them far enough laterally to contact the beams 61.

As shown in FIG. 1, the assemblies 60 are spliced to the front and rear frame beams 64 and 65 at points 68, 69, 70 and 71 with alternate male and female couplings to permit quick assembly and disassembly. Specifically, the front frame beam 64 is provided with a male fitting at one end 68 and a female fitting at the other end 69, the male fitting at point 68 being adapted to fit into a corresponding female fitting on one of the assemblies 60 and the female fitting at point 69 being adapted to fit onto a corresponding male fitting on the other assembly 60. Corresponding male and female fittings are also provided at points 70 and 71 on the rear frame beam 65. This type of construction makes it possible to remove the front and rear beams 64 and 65, the diagonal frame beams 66, and the power tongue assembly 22 and connect both wheel frame assemblies 60 together, thereby to narrow the ground car and permit it to travel along a public road. If this is done and the wheels 14 are too high to pass underneath an overhead obstruction, the metal wheel halves 30 can be removed, thereby to permit the assemblies 60 to travel merely on the rubber tire and wheel assemblies 36.

A front splice plate 80 is provided over the connections on top and bottom between the wheel frame assemblies 60 and the front frame beam 64. The plates 80 provide extra strength for the torsional loads that are generated between the outside frame beam 61, the inside frame beam 62 and the front frame beam 64. The plates 80 also strengthen the connections made at the points 68 and 69. A rear splice plate 82 is provided over the connections on top and bottom at points 70 and 71 between the wheel frame assemblies 60 and the rear frame beam 65.

A rear beam snipe superstructure 84 is mounted on each side of the rear frame beam 65 to strengthen the beam and the splices at points 70 and 71, and to streamline the car so that when the car 12 moves itself backwards on the cable 10 it will not strike and jam against an obstacle. The tapered shape of the superstructure 84 will instead permit the car to strike any obstcale a glancing blow so that the car can move past. A snubbing bull hook 86 is attached to the rear end of each of the wheel frame assemblies 60 as shown in FIG. 1. The hooks 86 may be used to snub the machine to a stump by hooking a choker cable (not shown) to the hook. Logs may also be attached to the hooks 86 by choker cables 87 for skidding. (See FIG. 1.) It should be noted, however, that it is the rear end of the power tongue assembly 22 that is primarily used to support the ends of the logs when they are being skidded and swung.

As previously mentioned, the entire power tongue assembly 22 is swivel mounted within the frame 20, being supported by the front and rear frame beams 64 and 65. The power tongue assembly 22 will be described in more detail hereinafter, but at this point it is sufficient to note that it comprises a power tongue beam 88 which rolls and slides back and forth on rollers 90. The rollers are mounted on slides 91 inside front and rear male swivel blocks 92, 93 rotatively positioned inside front and rear female swivel blocks 94, 95, respectively, which are themselves mounted within the front and rear frame beams 64 and 65, respectively. (See FIGS. 3 and 4.) The front female swivel block 94 is the outside stationary part of the swivel bearing and is held in place in the front frame beam 64 by flanges 96 on top and bottom which prevent any longitudinal movement yet permit it to slide back and forth in a greased swivel block slide 98 inside the front frame beam 64. The front male swivel block 92 fits into and also rotates inside of the front female swivel block 94 as the power tongue assembly 22 rotates. The rollers 90 support the power tongue beam 88 and allow the power tongue assembly 22 to roll forward or rearward as required by the load on the ground car 12. Rollers 90 are provided for the bottom and sides of the power tongue beam 88, but none is needed on the top. The rear female swivel block 95 cannot translate laterally, but only rotates on a rear swivel block pivot pins 100 when the front end of the power tongue beam 88 moves laterally in the swivel block slide 98 in the front frame beam 64.

Steering of the ground car is accomplished by a hydraulic pump 102 which furnishes hydraulic fluid under pressure to a double-acting hydraulic cylinder 104 attached to the front female swivel block 94, thereby to move the front end of the power tongue beam 88 laterally on the slide 98 inside the front frame beam 64. The pump 102 and cylinder 104 function to steer the ground car 12 in the following manner. When the power tongue beam 88 is canted to the right, the tension on the ground cable 10 will force the wheels to run to the left, thereby to move the ground car laterally across the logging slope. In 1,000 feet of run, the ground car will be moved laterally approximately 60 feet by the steering means here described.

The power tongue assembly

As mentioned above the power tongue assembly comprises a power tongue beam 88, which is in the form of a hollow box beam. The beam is enlarged in its longitudinal center section to form the bottom, sides and top framework of an assembly which comprises a cab 110 and the supporting structure for the two diesel engines 18, the capstan drums 24, 26, the hydraulic pumps 28 and the hydraulic motors 29. (See FIGS. 5, 6 and 10.) The fact that the power tongue beam 88 swivels in the frame 20 allows the entire power tongue assembly 22 to roll and deflect when the car crosses over an obstacle, thereby to prevent damage to the assembly.

Longitudinal movement of the entire power tongue assembly 22 is effected by a double-acting hydraulic cylinder 112 mounted beneath the cab 110 and having a ram 114 attached to the rear male swivel block 93. A steel spring 116 is mounted between the cab 110 and the cylinder 112 to act as a shock absorber between the power tongue assembly 22 and the frame assembly 20, thereby to help absorb impacts as they are transmitted up through the wheels and frame. At the command of the operator in the cab 110 or by remote radio signal, the entire power tongue assembly 22 may be moved forwardly or rearwardly with respect to the frame assembly 20.

When skidding logs to the ground car, the power tongue assembly is positioned somewhat ahead of the ground car 12 to counteract the rear loading, but the power tongue beam 88 is still permitted to protrude far enough to the rear to give clearance around the apparatus. When swinging a turn of logs to the landing, the power tongue assembly is positioned completely forward (as shown in FIG. 1) to provide sufficient lead and balance. When the ground car 12 is hauling itself back empty on the cable 10, the power tongue assembly 22 is positioned to the rear, thereby both to lead the machine rearwardly and to balance it.

The power tongue beam 88 is provided with a front fairlead 118 on which are mounted two horizontally disposed rollers 120 and two vertically disposed rollers 122 through which the ground cable 10 passes. A front fairlead rubber tired wheel 124 is mounted beneath the fairlead 118 to float and bounce over the slash. Since the entire ground car is slightly front heavy due to the positioning of the power tongue assembly 22, the wheel 124 takes care of this front loading and prevents the power tongue beam 88 from striking the ground. The beam 88 is also provided with a rear fairlead 126 on which are also mounted two horizontally disposed rollers 128 and two vertically disposed rollers 130 through which the cable 10 passes.

The capstan 16 is the tractive part of the ground car. The capstan 16 comprises two metal drums 24, 26, each of which may be for example, thirty-six inches in diameter and around which the stationary ground cable 10 is "figure-8" wrapped. The ground car is motivated when the power from the hydraulic motors 29 is applied to the capstan drums.

In the embodiment shown in FIG. 7, each of the drums 24, 26 has a plurality of channels or grooves 131 cut therein, and the grooves 131 of one drum match those of the other. The capstan drums 24, 26 are provided with V-belts 136 which fit snugly down into the bottoms of the grooves 131 therein. The belts 136 act both as wear plates and friction clutches between the cable 10 and the capstan drums 24, 26. Under impact and shock loads the belts 136 will slip slightly to help ease the strain on all of the parts. Since the belts are relatively inexpensive and can be easily replaced, they will take all the wearing, scoring and abrasion rather than the cable or the drums.

Alternatively, each of the capstan drums 24, 26 may be made in the form of a smooth-faced pulley 180 with a solid flange 182 on one side and a removable clamp flange 184 on the other side. (See FIG. 10.) A capstan channelled belt 186 in the form of a rubber composition sleeve slips on each capstan drum 24, 26 after the removal of flange 184. The channels 187 of one capstan channelled belt 186 match the channel dividers 188 of the other capstan belt 186. Under impact and shock loads the belts 186 function similarly to the belts 136 above described.

An adjustable guide pulley 132 is provided on each side of the capstan 16 to direct the cable 10 so that it approaches the capstan drums 24, 26 at the correct bias angle. Thus, the cable 10 enters the first groove in the first drum at a slight bias angle to the axis thereof, thereby to cause the cable 10 to wrap around the second drum and then to return and wrap around the adjacent channel on the first drum without binding or rubbing. This criss-cross reeving of the cable 10 between the two capstan drums 24, 26 forms a "figure 8."

The same bias angle is maintained through all of the "figure-8" wraps. The guide pulleys 132 can be adjusted so that more or less wrappings of cable can be wound around each drum. I have found that if the capstan drums 24, 26 are mounted at a four degree angle to the longitudinal axis of the power tongue assembly 22, it is possible to achieve better alignment of the ground cable from fairlead 118 through the capstan 16 and to fairlead 126.

Four pressure-mounted capstan idler rolls 134 faced with hard rubber are also provided. The rolls 134 maintain pressure on the cable in the channels and allow no channel jumping or slack to accumulate in the "figure-8" wraps even if the ground cable is completely slacked off on both sides of the capstan drums. The idler rolls 134 are made convex in that portion spanning the grooves in the capstan drums and are concave in the portion spanning the groove dividers. The idlers 134 are tied together by an adjustable tension spring (not shown) which presses them against the capstan drums.

As previously mentioned, the diesel engines 18 transmit their power to hydraulic power transmission pumps 28, which in turn transmit the power to the hydraulic motors 29 in the capstan drums. The hydraulic pumps 28 actually comprise six such pumps, three for each of the two diesel engines 18. Two of these six pumps furnish power for a skidding cable 140 wound on skidding cable drums 142. The other four pumps are used to drive the hydraulic motors 29 in the capstan drums 24, 26. A control console (not shown) is provided to obtain the desired action from the pumps. This arrangement provides for all forward, rearward and braking action for the capstan 16, as well as for the drums 142 on which the skidding cable 140 is wound and the various hydraulic cylinders. Thus the ground car is provided with sufficient power to climb slopes to 100% or more and then evenly and smoothly brake itself as it returns down with a load of logs appended thereto.

The skidding cable 140 will preferably be of ⅞ inch diameter and is wound on two skidding cable drums 142 mounted within the center section of the power tongue beam 88 and which are powered by the hydraulic pumps 28. The drums 142 are activated either by the operator aboard the ground car or by radio signals from a remote point. The cable passes out from the drums 142 through the power tongue beam 88 to the rear fairlead 126 on which a skidding cable swinglead 144 is mounted. The swinglead 144 can rotate from a horizontal position whereby the cable 140 can extend horizontally from a rear of the ground car to a vertical position which is desirable when the logs are swung to the landing. A bull hook 146 is attached to the end of each of the skidding cables 140.

The cab 110 is provided with padded seats and seat belts for the use of the operator and other loggers. The cab 110 also houses the radio which receives the radio signals, as well as the air breather for the diesel engines 18. The diesel engines are provided with exhaust stacks 148 which extend high enough above the rear deck 150 of the power tongue assembly so that the ground car can run through deep water. The ports on the engines 18 and the entire hydraulic power system are made watertight so that the car can move through substantial depths of water.

A-frame assembly

A modification of the invention is illustrated in FIG. 2 of the drawings wherein the ground car 12 of the present invention is provided with an A-frame assembly to give the apparatus more lift and more skidding reach. This embodiment will be used on skid roads where there is little possibility of the ground car turning over. In this embodiment of the invention the skidding cable 140 passes up through an A-frame 152 rather than out through the rear fairlead 126. The A-frame 152 is so arranged that it can be raised or lowered, extended or retracted. Using the A-frame, logs can be skidded in with slip hooks and bull hooks, or the A-frame can be rigged to log by highlead. At the landing when end hooks are attached to the skidding cables, the A-frame makes a good log leader. The A-frame 152 is comprised of a pair of outside legs 154 which are pivotally mounted on the inside frame beams 62. Fitting and telescoping down into the legs 154 are a pair of inside legs 156, the upper parts of which are joined together by an extendable crosspiece (not shown) on which is mounted a skidding cable swinglead 158. The skidding cable 140 passes from the skidding drums 142 through the deck 150 and the swinglead 158. With the additional height provided by the A-frame 152, one logger can draw skidding cable out 100 feet or more to hook logs.

The A-frame 152 is raised or lowered by a pair of hydraulic cylinders 160 attached to the legs 154 and having rams 162 attached to the diagonal frame beams 66. An extension hydraulic cylinder (not shown) effectuates the telescoping up and down of the inside legs 156 in the outside legs 154.

Operation

The cable logging system herein disclosed can be used in many different ways efficiently and economically to log timber. A simple logging layout using the system of the present invention and reaching out up to 4000 feet is illustrated in FIG. 11. The first step in using the system of the present invention is to lay out the ground cable 10. To make this initial layout in a new setting, the ground cable 10 is reeled off a line truck 164 at the landing and this cable then is run through a pulley block attached to a landing stump 166 and then the cable 10 is threaded through the apparatus. Then 100 feet or so of skidding cable 140 is pulled out by the rigging crew and anchored to a stump. The ground car winches itself backwards out onto the logging slope with the skidding cable 140 using the drums 142, at the same time drawing additional cable 10 from the line truck 164. Thus, the car can pull itself 100 feet or more at a time up the slope and then be snubbed to a stump while the rigging crew pulls out the skidding cable another 100 feet or so.

When the car and ground cable reach the backend of the log setting, the cable 10 is run through a siwash block 167 which is attached to a stump 168 with a knock-out pin apparatus. The same method of the ground car 12 winching itself with its skidding cable 140 can be used to lay out the ground cable 10 across the back end of the setting, running it through additional siwash blocks 169 attached to stumps 170, 172. Optionally, instead of the method just described, a complete strawline layout can be made across this backend from stump 168 to stump 174. Then with the ground car snubbed and with the capstan drums pulling slack cable from the line truck 164, one skidding drum can reel in the strawline which draws the ground cable across the back setting to the final or "tail hold" stump 174. The ground car can then be used to haul logs down the hill to the landing as desired.

To change skid roads, the knockout pin in the siwash block 167 is driven out and the ground cable 10 permitted to fall down into the next preset siwash block 169 which is anchored 100 feet or so across the back line to the stump 170. As the ground car swings the last turn of logs down to the landing, the steering cylinder 104 cants the power tongue beam 88 to the outside (to the right as the drawing is viewed) so that the wheels 14 run to the inside (to the left as the drawing is viewed). This causes the ground cable 10 to move over into the new skid road (shown in the dashed line in FIG. 11). At the landing, the line truck 164 can then pick up any slack which has accumulated in the ground cable. In this manner an entire area can be logged.

In the foregoinng description the invention has been described with reference to certain particular preferred embodiments, although it is to be understood that the specific details shown are merely illustrative and that the invention can be carried out in other ways without departing from the true spirit and scope of the following appended claims.

I claim:
1. A wheel for a logging car comprising
   a pair of symmetrical monolithic wheel halves connectable together on a diameter of said wheel, and
   a plurality of semi-circular ring members positioned on the exterior of said wheel halves to splice said wheel halves together along said diameter of said wheel, said ring members serving as additional rims on the side of said wheel to permit the car to climb up on an obstacle in the path thereof.
2. A wheel as in claim 1, in which said wheel halves are frustoconical.
3. A wheel as in claim 1, in which said wheel halves are cylindrical.
4. A wheel as in claim 1, further comprising at least one coaxial rubber tired wheel mounted interiorly thereof.
5. A wheel as in claim 4, further comprising an axle rotatable with said wheel, said rubber tired wheel being mounted on said axle, said rubber tired wheel and said axle being movable vertically with respect to said wheel halves thereby to serve as a shock absorber therefor.
6. A wheel as in claim 1, in which said ring members are staggered on the exterior of said wheel halves.

References Cited

UNITED STATES PATENTS

| 1,272,664 | 7/1918 | Hummel et al. | 152—352 |
| 1,456,062 | 5/1923 | Killen | 152—352 |

FOREIGN PATENTS

| 608,615 | 9/1948 | Great Britain. |

ARTHUR L. LA POINT, Primary Examiner

C. B. LYON, Assistant Examiner

U.S. Cl. X.R.

152—352; 301—63